Sept. 23, 1969     A. H. JOYCE ET AL     3,468,784

ELECTRICAL STOCK REMOVAL APPARATUS

Filed Oct. 13, 1965

INVENTORS
Alexander H. Joyce &
BY   Antonio Pirrello

Hugh L. Fisher
ATTORNEY

United States Patent Office 3,468,784
Patented Sept. 23, 1969

3,468,784
ELECTRICAL STOCK REMOVAL APPARATUS
Alexander H. Joyce, Detroit, and Antonio Pirrello, Lincoln Park, Mich., assignors to General Motors Corporation, Detroit, Mich., a corporation of Delaware
Filed Oct. 13, 1965, Ser. No. 495,468
Int. Cl. B23p *1/16*
U.S. Cl. 204—224
8 Claims

ABSTRACT OF THE DISCLOSURE

Electrochemical machining apparatus incorporating a hollow cylindrical cutting tool having a portion between the cutting tip and the shank coated with insulating material, a conductive core in the tip through which electrolyte can flow, external electrolyte passages in the periphery of the shank of the cutting tool and an enclosure surrounding these external passages. The enclosure includes a sleeve and a distributor which are interconnected to provide both a passage and an accumulator chamber for the electrolyte. The electrolyte then exits from the chamber by way of an opening in the distributor and in a direction and at a velocity that opposes and thereby reduces the velocity of the contaminated electrolyte which is ejected from the cavity at the surface of the workpiece.

---

This invention relates to improvements in electrical stock removal apparatus, and particularly relates to electrode structure adapted, although not exclusively, for use with the electrochemical machining process.

When cavity sinking with the electrical stock removal processes, such as that known as electrochemical machining, an electrolyte is often fed to the machining area through the cutting tool. The electrolyte is then ejected at a high velocity from between the cutting tool face and the cavity wall. This ejected electrolyte forms discrete high velocity streams that provide a conductive path between the machined cavity wall and the side of the cutting tool. As a result, unwanted grooves are machined in the cavity wall.

To overcome the foregoing problem, it is proposed in a unique and novel way to reduce the velocity head of the ejected electrolyte and thereby achieve smooth cavity walls and also permit faster feed rates. Specifically, it is proposed that the velocity of the ejected electrolyte be reduced by a counteracting flow that dissipates the kinetic energy of the ejected electrolyte.

Further contemplated is a novel electrode structure that includes a shank portion with passages for the electrolyte and a distributor that facilitates the development of the suppressor flow. The electrode also is provided with an insulated portion that reduces secondary erosion and shorting along the length of the electrode and an enlarged cutting tip that both protects the insulating material, and also defines the desired cross-sectional area and shape of the cavity.

The foregoing and other objects and advantages of the invention will become apparent from the following description and from the accompanying drawings, in which.

Figure 1:
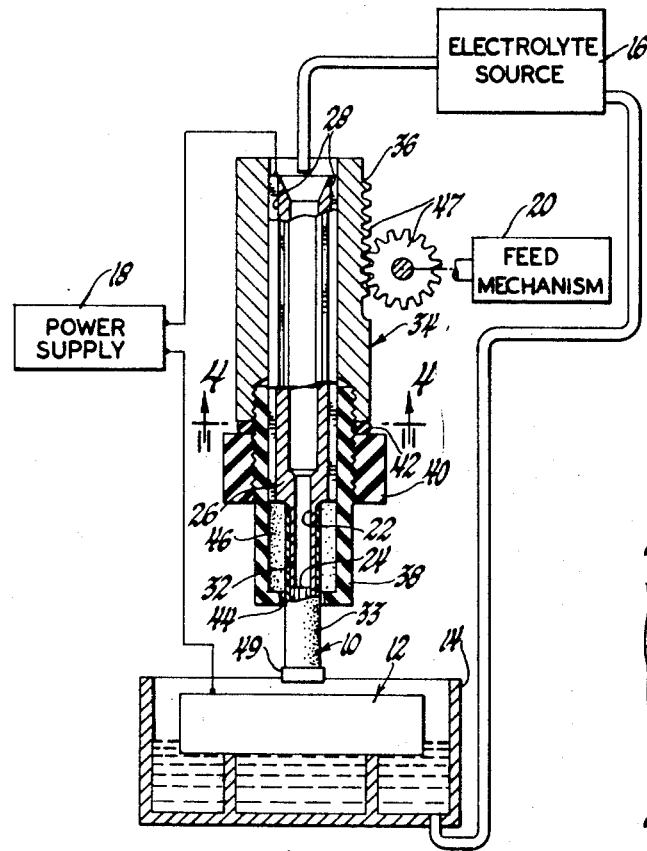
FIGURE 1 is a schematic illustration of apparatus incorporating the principles of the invention.

The apparatus displayed in FIGURE 1 includes a pair of electrodes 10 and 12, which will hereafter be referred to as the cutting tool and the workpiece, respectively. Both the cutting tool 10 and the workpiece 12 are made of a conductive material. Since the electrochemical machining process is to be carried out by the FIGURE 1 apparatus, the workpiece 12 is also formed of an electrochemically erosive material. The workpiece 12 is positioned within and electrically insulated from a tank 14. An electrolyte from an electrolyte source 16 is supplied through the cutting tool 10 to the machining area after which it flows into the tank 14. The contaminated electrolyte in the tank 14 is not allowed to accumulate but is continuously withdrawn by the source 16, which may include a reservoir and filter. The power supply 18 is connected across a gap maintained between the cutting tool 10 and the workpiece 12 by a feed mechanism 20. With machining current flowing by way of the electrolyte across the gap between the workpiece 10 and the cutting tool 12, the workpiece 12 is electrochemically machined in a well known way. As the workpiece 12 is machined the feed mechanism 20 advances the cutting tool 10 to maintain some optimum gap spacing.

The feed mechanism 20 can be of any suitable type; for example, one that provides a constant feed rate determined by the various parameters, such as the machining current, the type of electrolyte, and the material and sizes to be machined. Power supply 18 may provide either direct or alternating current, determined by the application of the process. The application of the process would also determine the polarities of the currents.

Figure 2:
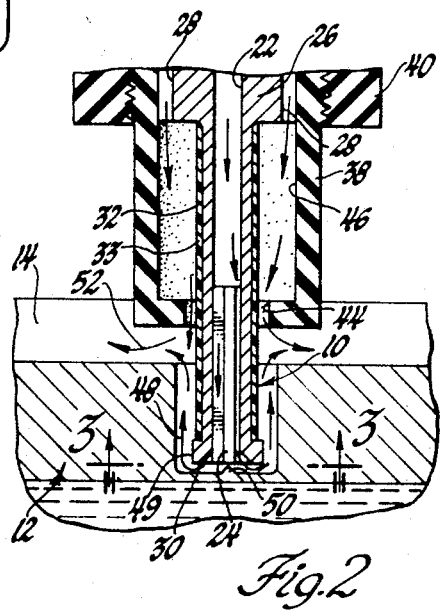
FIGURE 2 is an enlarged fragmentary view of the FIGURE 1 apparatus, showing the relationship between the cutting tool and workpiece electrodes.
Figure 4:
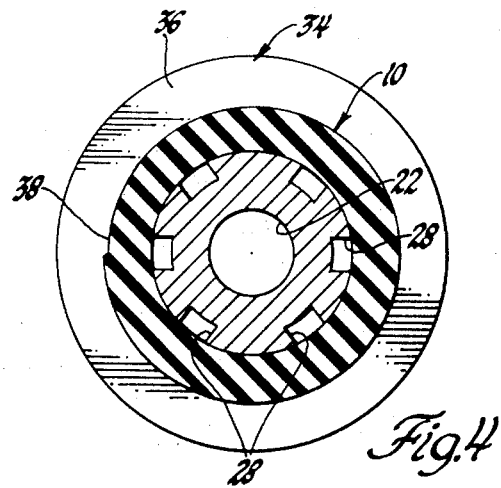
FIGURE 4 is another sectional view of the cutting tool electrode taken along the line 4—4 in FIGURE 1.
Figure 3:
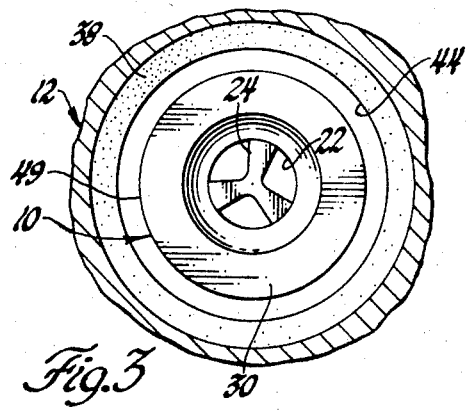
FIGURE 3 is a sectional view of the cutting tool electrode taken along the line 3—3 in FIGURE 2.

Considering now the details of the cutting tool 10 and with reference to both FIGURE 1 and FIGURE 2, the cutting tool 10 is formed of a tubular material with a center opening 22 in which is inserted a core 24 of a fluted configuration, as illustrated in FIGURE 3. The function of the core 24 will be subsequently explained. At the upper part, as displayed in FIGURE 1, the electrode is provided with a shank 26, which includes axially extending grooves 28 in the periphery thereof. These grooves 28 are also shown in FIGURE 4. At the lower part, the cutting tool 10 is provided with a cutting tip or face 30 of a size that will establish the dimensions of the cavity or hole to be sunk by the FIGURE 1 apparatus. Intermediate the shank 26 and the cutting face 30 is a reduced diameter portion 32; i.e., the reduced diameter portion 32 is of a lesser cross-sectional area than the cutting face 30. This reduced diameter portion 32 has an insulating coating 33 of a suitable electrically inert material along the length thereof.

Surrounding the cutting tool 10 is an enclosure 34 that serves to confine the electrolyte to the grooves 28. The enclosure 34 is formed in two parts comprising a sleeve 36 and a distributor 38 that are interconnected, such as by threads. An adjusting nut 40 and an O-ring type seal 42 insure that the threaded connection is leakproof. The distributor 38 is preferably formed of a nonconductive material. At its lower end the distributor 38 is provided with a calibrated opening 44, which forms a second exit for the electrolyte from the source 16; the other, as mentioned, being through the center opening 22 in electrode 10. It should be noted that the electrolyte flows through the grooves 28 and first to a chamber, designated generally at 46, formed between the inside diameter of the distributor 38 and the outside diameter of the cutting tool 10 before it exits at the opening 44. This chamber 46 serves as an accumulator so that the flow from the opening 44 is more constant.

The enclosure 34 additionally provides a support for the cutting tool 10, which may be releasably affixed thereto in some conventional way, or an appropriate friction fit may be employed. Another function of the enclosure 34 is to serve as the rack part of a rack and pinion combination 47 for the feed mechanism 20.

The electrolyte that flows through the center opening 22 in the cutting tool 10 exits at the cutting tip 30 and thereby facilitates the electrochemical erosion. From this exit the electrolyte flows into the small machining area with a relatively large pressure head and then flows, as indicated by arrows 48, to a larger area between the side walls of the cavity or hole being drilled, and subsequently from the point of entry of the cutting tool 10 into the workpiece 12. Because of this change in areas and the pressure head, the electrolyte gains a considerable velocity head. For example and without limitation, the electrolyte may have a velocity of 100 feet per second or more. As a result the electrolyte forms discrete streams, each of which in passing upwardly in the direction of arrows 48 affords a conductive path between the walls of the cavity and a peripheral part, shown at 49, of the cutting tool face 30. These conductive paths cause corresponding grooves to be machined in the cavity walls.

The insulating coating 33 along the reduced diameter portion 32 prevents the side erosion that, as will be appreciated, would otherwise occur and result in the cavity becoming oversized or tapered. The cutting tip 30, being larger in diameter, prevents the edge of the insulating material from being torn, burned or otherwise damaged during the machining.

The core 24 facilitates the distribution of the electrolyte at the exit and, being of conductive material, aids in the machining of a tip 50 that tends to develop in the opening 22 at the cutting tip 30. This tip 50 tends to produce short circuits.

These mentioned discrete streams of ejected electrolyte are suppressed or have their kinetic energy absorbed by the electrolyte flowing through the exit 44 in the distributor 38. The opening 44 is selected so that the electrolyte will flow therefrom at a proper velocity in a direction indicated by arrows 52. The accumulator effect of the chamber 46 insures that the flow is continuous. The electrolyte flowing from the distributor 38, being in an opposite direction to that of the electrolyte being ejected from the workpiece cavity, effectively reduces the velocity of this ejected electrolyte. As can be appreciated, if both oppositely directed streams of electrolyte have identical velocity heads, the kinetic energy of the electrolyte from the cavity will be completely dissipated. Considered in a different way, the electrolyte flow from the distributor 38 floods the area where the electrolyte proceeding from the machining area has a high velocity head and thus affords the desired suppression. This avoids the need to operate with the cutting tool 10 and workpiece 12 immersed in the electrolyte. Such immersion is objectional because (1) the tank 14 must be at least partially emptied each time the operator adjusts or changes workpieces in order to avoid doing this blindly; (2) the machining operation cannot be observed; and (3) all of the fixturing is exposed to the corrosive effects of the electrolyte, this being increased due to stray currents.

This suppression not only avoids the formation of the undesired grooves in the workpiece cavity so that smooth cavity walls can be obtained, but also enables the process to be carried out with a faster feed rate, thereby substantially reducing machining time.

Summarizing briefly, while the cutting tool 10 is being fed into the workpiece 12, electrolyte is transferred from the source 16 through the opening 22 in the cutting tool 10 for machining purposes. This electrolyte then flows in the direction of arrows 48 from the small machining area, where it has acquired a maximum velocity head, to a larger area between the cutting tool 10 and the workpiece 12, and in so doing tends to retain this considerable velocity head. The electrolyte from the source 16 is also transferred by way of grooves 28 and through the distributor opening 44 in a counter-direction, identified by the arrows 52, so as to oppose and diminish the velocity head by effectively flooding this larger area. This, as mentioned, facilitates a faster feed rate while attaining the desired smooth cavity side walls.

The invention is to be limited only by the following claims.

What is claimed is:

1. Apparatus for electrochemically machining cavities in conductive workpieces with an electric current comprising, in combination, a hollow cutting tool formed of conductive material and having the tip thereof shaped to machine a cavity of a desired configuration in the workpiece, a source of electrolyte under pressure communicating with the cutting tool so that the electrolyte successively flows through the cutting tool, exits at the cutting tool tip, reverses directions, and is thereafter ejected at the workpiece surface from the cavity between the workpiece and the cutting tool tip, and velocity of flow reducing means for directing electrolyte from the source in the opposite direction of and towards the ejected and contaminated electrolyte as it exits from the cavity at the workpiece surface so as to oppose and reduce the velocity of flow thereof and thereby avoid secondary erosion of the cavity walls by the ejected electrolyte.

2. Apparatus as described in claim 1, wherein the reducing means is carried by the cutting tool.

3. Apparatus as described in claim 1, wherein the reducing means includes passage means exterior of the cutting tool communicating with the electrolyte source and arranged to have the exit thereof in the vicinity of the cavity at the workpiece surface.

4. Apparatus as described in claim 1, wherein the reducing means includes passage means carried by the cutting tool and communicating with the electrolyte source and means distributing the electrolyte from the passage means towards the cavity at the workpiece surface so as to direct a relatively high velocity flow of the electrolyte against the ejected electrolyte so as to reduce the velocity of the ejected electrolyte.

5. Apparatus as described in claim 1, wherein the reducing means includes a series of passages formed in the periphery of the cutting tool, the series of passages also communicating with the electrolyte source, and enclosure means surrounding the cutting tool so as to confine the electrolyte to the passages, the enclosure means including a distributor for directing the electrolyte in the passages toward the cavity at the workpiece surface and at a certain velocity so as to dissipate the flow velocity of the ejected and contaminated electrolyte.

6. Apparatus as described in claim 5, wherein the cutting tool is of a cylindrical configuration having a shank with the series of external passages in the periphery thereof, and a portion between the shank and the tip of a smaller cross-sectional area than the tip, the portion being enclosed with an insulating material, and an insert in the electrolyte exit of the cutting tool, the insert being also of conductive material and so shaped as to permit electrolyte flow therethrough for distributing the erosion effect in the vicinity of the electrolyte exit from the cutting tool.

7. Electrode structure for electrochemically machining cavities in a workpiece comprising, an elongated hollow cylindrical electrode of conductive material and having at one end a cutting tip of a larger cross-sectional area than the portion of the electrode adjacent to the cutting tip and at the other end a shank provided with a series of external passages for fluid each extending axially along a part of the electrode, an insulating coating surrounding the portion of the electrode between the cutting tip and the shank, a core inserted in the electrode at the cutting tip, the core being of conductive material and having plural openings therein to permit fluid flow therethrough for facilitating electrochemical machining in the area of exit from the electrode and an enclosure surrounding the shank of the electrode so as to confine fluid to the external passages, the enclosure including a distributor provided with a fluid exit spaced from the cutting tip so as not to enter the cavity and of a shape that causes the fluid to be directed therefrom at a relatively high velocity towards the workpiece surface in the vicinity of the cavity to be machined.

8. The method of electrochemically machining of cavities in the workpiece comprising, the steps of maneuvering the workpiece and a cutting tool relative to each other so as to provide a machining gap therebetween, supplying machining power to the gap, supplying an electrolyte to the gap so that the electrolyte flows through the cutting tool then reverses directions, flows between the exterior of the cutting tool and the machined cavity walls of the workpiece and is ejected from the cavity opening at the workpiece surface, and supplying an electrolyte to the workpiece surface in the vicinity of the cavity opening at a velocity and in the opposite direction of the ejected electrolyte so as to reduce the flow velocity of the ejected electrolyte and thereby avoid secondary erosion of the cavity walls.

References Cited
UNITED STATES PATENTS

| | | | |
|---|---|---|---|
| 3,075,903 | 1/1963 | Costa et al. | 204—224 XR |
| 3,214,360 | 10/1965 | Bender et al. | 204—224 |
| 3,288,698 | 11/1966 | Bruns | 204—224 |
| 3,293,166 | 12/1966 | Cowing | 204—224 |
| 3,330,754 | 7/1967 | Trager | 204—224 |

JOHN H. MACK, Primary Examiner

D. R. VALENTINE, Assistant Examiner

U.S. Cl. X.R.

204—143, 225, 284